US011176587B2

United States Patent
Feris et al.

(10) Patent No.: US 11,176,587 B2
(45) Date of Patent: Nov. 16, 2021

(54) METHOD, A SYSTEM, AND A COMPUTER READABLE STORAGE MEDIUM FOR AUTOMATED RECOMMENDATIONS FOR AN ONLINE SHOPPING CART

(71) Applicant: International Business Machines Corporation, Armonk, NY (US)

(72) Inventors: Rogerio S. Feris, Hartford, CT (US); James R. Kozloski, New Fairfield, CT (US); Clifford A. Pickover, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 14/972,867

(22) Filed: Dec. 17, 2015

(65) Prior Publication Data
US 2017/0178218 A1 Jun. 22, 2017

(51) Int. Cl.
*G06Q 30/00* (2012.01)
*G06Q 30/06* (2012.01)

(52) U.S. Cl.
CPC ..... *G06Q 30/0631* (2013.01); *G06Q 30/0633* (2013.01)

(58) Field of Classification Search
CPC .................. G06Q 30/0633; G06Q 30/0631
(Continued)

(56) References Cited

U.S. PATENT DOCUMENTS 5,122,952 A    6/1992   Minkus
6,544,097 B1   4/2003   Bain
(Continued)

FOREIGN PATENT DOCUMENTS

CN        201216881      4/2009
KR   1020140120591    10/2014
WO      2011120106    10/2011

OTHER PUBLICATIONS

Gingera, R. (2005). Designing for the prostate cancer population: An integrated exercise and social support system (Order No. MR37480). Available from ProQuest Dissertations & Theses Global. (305029547). (Year: 2005).*

(Continued)

*Primary Examiner* — Jason B Dunham
*Assistant Examiner* — Arielle E Weiner
(74) *Attorney, Agent, or Firm* — Fleit Intellectual Property Law; Jose Gutman

(57) ABSTRACT

An information processing system, a computer readable storage medium, and a method for providing a recommendation for a plaything as a recommended item can include analyzing information received from a person monitoring system to provide an analysis for providing the recommendation for the plaything, and based on the analysis, sending a representation of the recommended item in a signal to a shopping cart such as an online shopping cart. The system can include an analysis module that receives information from a person monitoring system, and at least one processor configured to analyze information received from the person monitoring system (for one or more persons) to provide an analysis. The analysis provides a recommendation for a plaything. The processor can further send a representation of the recommended item in a signal to a shopping cart to upload into the shopping cart based on the analysis. Other embodiments are disclosed.

13 Claims, 5 Drawing Sheets

(58) Field of Classification Search
USPC .............................................. 705/26.1–27.2
See application file for complete search history.

(56) References Cited

U.S. PATENT DOCUMENTS

| | | | | |
|---|---|---|---|---|
| 6,865,546 | B1 | 3/2005 | Song | |
| 9,189,811 | B1* | 11/2015 | Bhosle | G06Q 30/0631 |
| 9,674,579 | B1* | 6/2017 | Jaini | H04N 21/4756 |
| 2003/0046172 | A1* | 3/2003 | Himmel | G06Q 10/0836 |
| | | | | 705/339 |
| 2008/0249867 | A1* | 10/2008 | Angell | G06Q 30/02 |
| | | | | 705/14.26 |
| 2008/0262918 | A1* | 10/2008 | Wiener | G06Q 30/02 |
| | | | | 705/14.23 |
| 2013/0078600 | A1* | 3/2013 | Fischer | G09B 19/00 |
| | | | | 434/236 |
| 2013/0097052 | A1* | 4/2013 | Dicker | G06Q 30/02 |
| | | | | 705/26.7 |
| 2013/0166404 | A1* | 6/2013 | Weissman | G06Q 30/0605 |
| | | | | 705/26.4 |
| 2014/0063461 | A1* | 3/2014 | Yao | A61B 3/113 |
| | | | | 351/210 |
| 2014/0109046 | A1* | 4/2014 | Hirsch | G06F 9/44 |
| | | | | 717/120 |
| 2014/0370470 | A1* | 12/2014 | Aristizabal | G16H 40/63 |
| | | | | 434/236 |
| 2015/0170245 | A1* | 6/2015 | Scoglio | G06Q 30/0623 |
| | | | | 705/14.55 |
| 2015/0339756 | A1* | 11/2015 | Konik | G06Q 30/0631 |
| | | | | 705/26.7 |
| 2016/0125759 | A1* | 5/2016 | Dougherty | G09B 19/00 |
| | | | | 434/236 |
| 2016/0307259 | A1* | 10/2016 | Lubeck | G06F 3/0482 |
| 2017/0006338 | A1* | 1/2017 | Kim | H04N 21/475 |

OTHER PUBLICATIONS

Ref U Continued: Retrieved from https://www.proquest.com/dissertations-theses/designing-prostate-cancer-population-integrated/docview/305029547/se-2?accountid=14753 (Year: 2005).*

Henry, P., et al., "RGB-D Mapping: Using Depth Cameras for Dense 3D Modeling of Indoor Environments", The 12th International Symposium on Experimental Robotics, Dec. 18-21, 2010, pp. 1-15.

Toy Industry Association, Inc., "Annual Sales Data", http://www.toyassociation.org/tia/industry_facts/salesdata/industryfacts/sales_data/sales_data.aspx?hkey#, Last visited on Oct. 21, 2015, pp. 1-4.

Computer Vision Group, "RGB-D Vision", http://vision.in.tum.de/research/rgb-d_sensors_kinect., Last visited on Oct. 21, 2015, pp. 1-4.

National Robotics Engineering Center, "Computer Vision Clinical Monitoring", http://www.nrec.ri.cmu.edu/projects/computer_vision_clinical_monitoring/, Last visited on Oct. 21, 2015, p. 1.

The Creativity Institute, "Early Childhood Development-Children and Toys", http://www.creativityinstitute.com/earlychildhooddevelopment-childrenandtoys.aspx. Last visited on Oct. 21, 2015, pp. 1-6.

Yandell, K., "Computer Vision May Aid in Screening for Autism", http://sfari.org/news-and-opinion/toolbox/2014/computer-vision-may-aid-in-screening-for-autism, Jul. 16, 2014, Last visited on Oct. 21, 2015, pp. 1-3.

* cited by examiner

METHOD, A SYSTEM, AND A COMPUTER READABLE STORAGE MEDIUM FOR AUTOMATED RECOMMENDATIONS FOR AN ONLINE SHOPPING CART

BACKGROUND

The present disclosure generally relates to monitoring and recommending, and more particularly relates to a method and system for providing a recommendation or a representation of a recommended item to an online shopping cart for a plaything based on monitoring a single person or subject or a group of persons or subjects.

The toy market is a huge retail industry with many different choices and varieties of objects for purchase. The same can be said for exercise equipment. Toys and exercise equipment can generally be referred to herein as "playthings". These terms may be used interchangeably in this disclosure and are understood in the context of the use. Recommendations for toys, exercise equipment or playthings are typically done based on age or other factors that may not necessarily be developmentally appropriate for a particular individual. A parent or teacher or coach may have their own individual preferences and recommendations for playthings, but such guardian or mentor can easily be distracted and miss opportunities for improvement.

BRIEF SUMMARY

According to one embodiment of the present disclosure, a method for providing a recommendation for a plaything can include analyzing information received from a person monitoring system to provide an analysis for providing the recommendation for the plaything as a recommended item, and based on the analysis, sending a representation of the recommended item in a signal to a shopping cart such as an online shopping cart to upload the shopping cart with the representation of the recommended item that represents the plaything.

In some embodiments, the person monitoring system monitors at least one among sounds, body and face motions, facial expressions, physiological signals, electrodermal activity, respiration rate, or heart rate for at least one or more persons being monitored. In some embodiments, the plaything is at least a toy or a piece of exercise equipment. The recommendation (or recommended item or the corresponding representation of the recommended item) can further include a recommendation of an exercise routine or a physical therapy routine for use with the plaything. In some instances, the terms "recommendation" or "recommended item" or "representation of the recommended item" may be used interchangeably in this disclosure and are understood in the context of use. In some embodiments, the recommendation or representation of the recommended item is visually segregated from other items existing in the shopping cart and in yet other embodiments access is provided to the visually segregated recommendations in the shopping cart to connections from a social network. In some embodiments, the signal is or corresponds to a multidimensional vector including parameters corresponding to at least one of playthings or toys for physical or muscle development, for sensory development, for make-believe and social development, or for creative and intellectual development. In some embodiments, a relevance of the analysis and the recommendation to a cohort of children is tracked.

According to another embodiment of the present disclosure, a system comprises an analysis module that receives information from a person monitoring system, at least one memory, and at least one processor communicatively coupled to the at least one memory and the analysis module. At least one processor can be configured to perform a method that includes analyzing by at least one processor information received from the person monitoring system to provide an analysis, the analysis providing a recommendation for a plaything as a recommended item and sending recommendation representation of the recommended item in a signal to a shopping cart to enable the uploading of the shopping cart with the plaything or representation of the recommended item based on the analysis. The person monitoring system can be configured to monitor at least one among sounds, body and face motions, facial expressions, physiological signals, electrodermal activity, respiration rate, or heart rate for at least one person. In some embodiments, the person monitoring system is at least one of a camera (or cameras), an audio recording device (or multiple audio recording devices), or one or more a physiological measurement devices placed external to the plaything or on the plaything or in the plaything. In some embodiments, the system receives the recommendation or representation of the recommended item based on multidimensional vectors to information in a dynamic database that includes information matching individuals or groups with playthings based on at least one or more of age, ability, safety, color, or texture. In some embodiments, the signal is or corresponds to a multidimensional vector including parameters corresponding to at least one of playthings for physical or muscle development, playthings for sensory development, playthings for make-believe and social development, or playthings for creative and intellectual development. In some embodiments, the at least one processor is further configured to periodically (weekly, monthly, quarterly, etc.) and automatically send the recommendation or representation of the recommended item to the shopping cart and purchase the items from the shopping cart as part of a subscription agreement. In yet other embodiments, the at least one processor is further configured to correlate an improvement of a development stage with the recommendation over a period of time and rank recommendations accumulated from a plurality of systems to provide a dynamic ranking of recommendations.

According yet to another embodiment of the present disclosure, a computer readable storage medium comprises computer instructions which, responsive to being executed by a one or more processors, cause the one or more processors to perform operations as described in the methods or systems above or elsewhere herein.

BRIEF DESCRIPTION OF THE SEVERAL VIEWS OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

According to various embodiments of the present disclosure, disclosed is a system and method for monitoring individuals or groups of individuals or users as they are behaving individually or engaging with playthings and/or each other and that further provides a signal to a shopping cart corresponding to a recommendation for purchase of a plaything. Specifically, according to an example, an individual such as a toddler can be monitored with one or monitoring devices (such as one or more cameras, microphones, or physiological monitoring devices) where the analysis of the inputs from the monitoring devices are used to match or substantially match parameters and entries in a database to enable the recommendation of at least one plaything for the individual that would be developmentally appropriate for the individual. In some sense, shopping cart software allows online shopping customers to accumulate a list (or set) of items for purchase, described metaphorically as "placing items in the shopping cart" or "adding to the cart." In some embodiments, the system automatically allows the cart to accumulate this set of items in a graphical user interface or GUI that is useful to the user. The shopping cart herein can include a visual interface where a user may view selected items (e.g., in the form of pictures and text or some other representation of the recommended item). Thus, in some embodiments, the cart includes a description or representation (e.g., an icon, photo, or text or other representation) of some object or service. The user may optionally interact with this representation to trigger the purchase. In some embodiments, the item is purchased as part of an automated subscription service in fulfillment of a user's subscription agreement, even if the user does not manually select the items. In this example, the items may appear in the cart and then are also automatically sent to a user.

Figure 1:
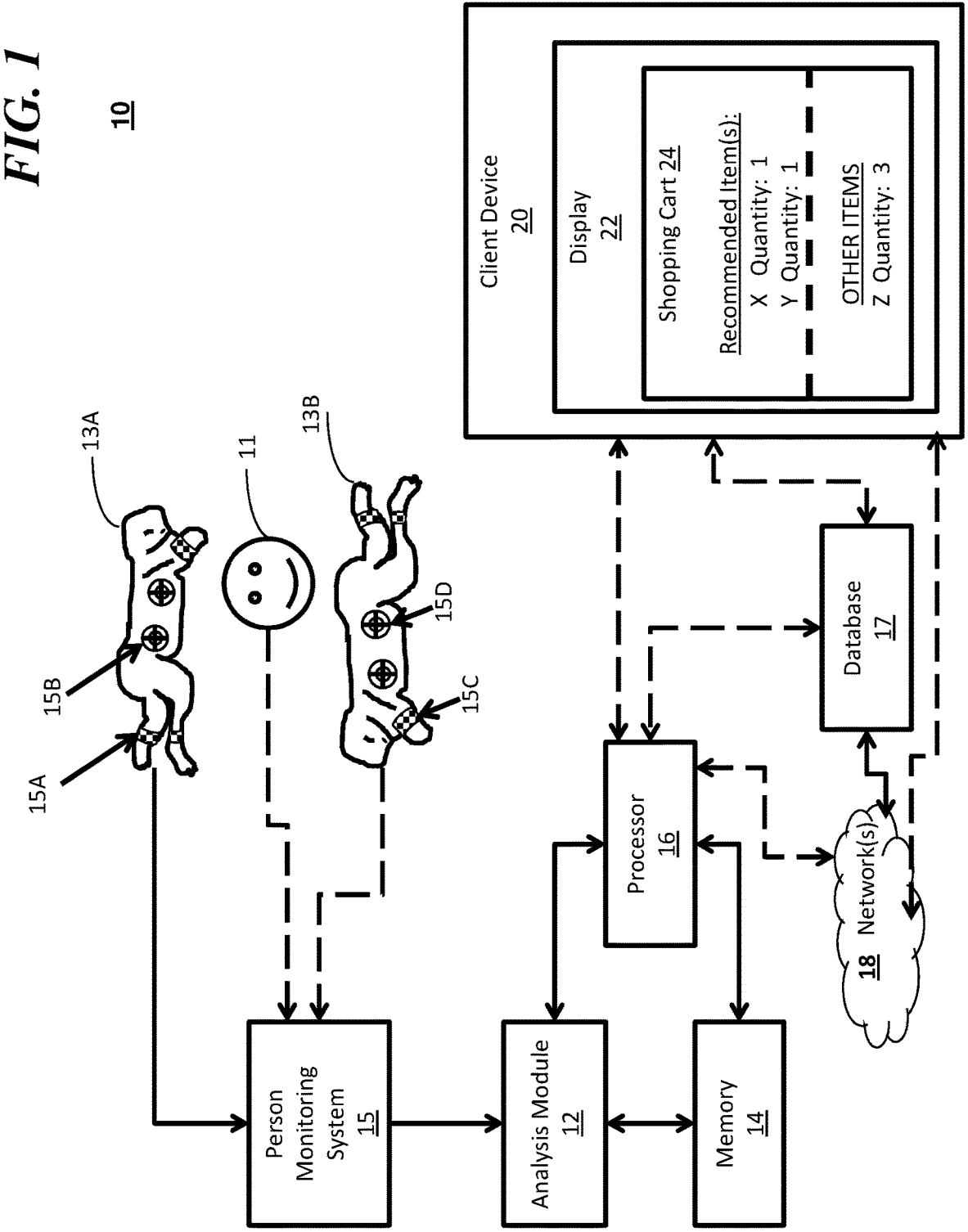
FIG. 1 is a block diagram illustrating an example of a system for recommending a plaything or a representation of a recommended item to a shopping cart, according to various embodiments of the present disclosure.

Referring to FIG. 1, a system 10 in accordance with the embodiments provides a method and system including an analysis module 12 that receives information from a person monitoring system 15 (e.g., a baby monitoring system) that monitors one or more individuals (13A and/or 13B) either individually or as they interact with each other or as they individually or as a group interact with a plaything 11. The person monitoring system can include or alternatively be a physiological monitoring device 15A, 15B, 15C, or 15D that measures motion, temperature, heart rate or any other number of physiological parameters. The analysis or the recorded data can be stored in a memory 14 which can be stored locally or remotely. Furthermore, the analysis or recorded data can also be stored or sent to a database 17 directly via a processor 16 or via the processor and one or more networks 18. Based on the analysis by the analysis module 12, a signal including a representation of a recommended item or recommendation is automatically sent to a shopping cart 24 for a particular toy or service. The shopping cart 24 and the recommended item(s) can be presented and viewed on a presentation device 22 such as a display on a client device 20. The signal can be sent directly via the processor 16 to the client device 20 or via the processor 16 and database 17 to the client device 20 or via the processor 16, the network, and the database 17 to the client device 20, or via the processor 16 and the network 18 to the client device 20. More generally, the method and system in some embodiments includes an activity and object (e.g., toy) recommendation service, for which the system 10 uses a visual and an audio monitor to evaluate skill level and state of the user (e.g., baby's development or state of the person with Alzheimer's or autism). This recommendation service tracks changes in development (or deterioration) of motor and cognitive skills in a user (13A) or group of users (13A and 13B). Based on the detected changes and target goals for a specific skill, the service recommends an activity or a plaything or toy that can be used to improve the specific skill. In this instance, the system recommends an item "X" and an item "Y". In a segregated area of the shopping cart 24, other items that are not recommended by the system 10 can be displayed. The other items can be items "Z" of which 3 are already placed in the shopping cart.

The analysis system may receive input from any of: sounds, body and face motions, facial expressions, physiological signals such as electrodermal activity, respiration and heart rate, or other physiological parameters. The signal to a shopping cart may cause an item or service or a representation of the item or service to be placed into an online shopping cart. As illustrated in FIG. 1, a section of a shopping cart 24 may be demarcated for these kinds of toys or services that are recommended versus other items manually placed in the shopping cart.

A discussion of various embodiments of the present disclosure will be provided below illustrating in more detail several examples.

Figure 2:
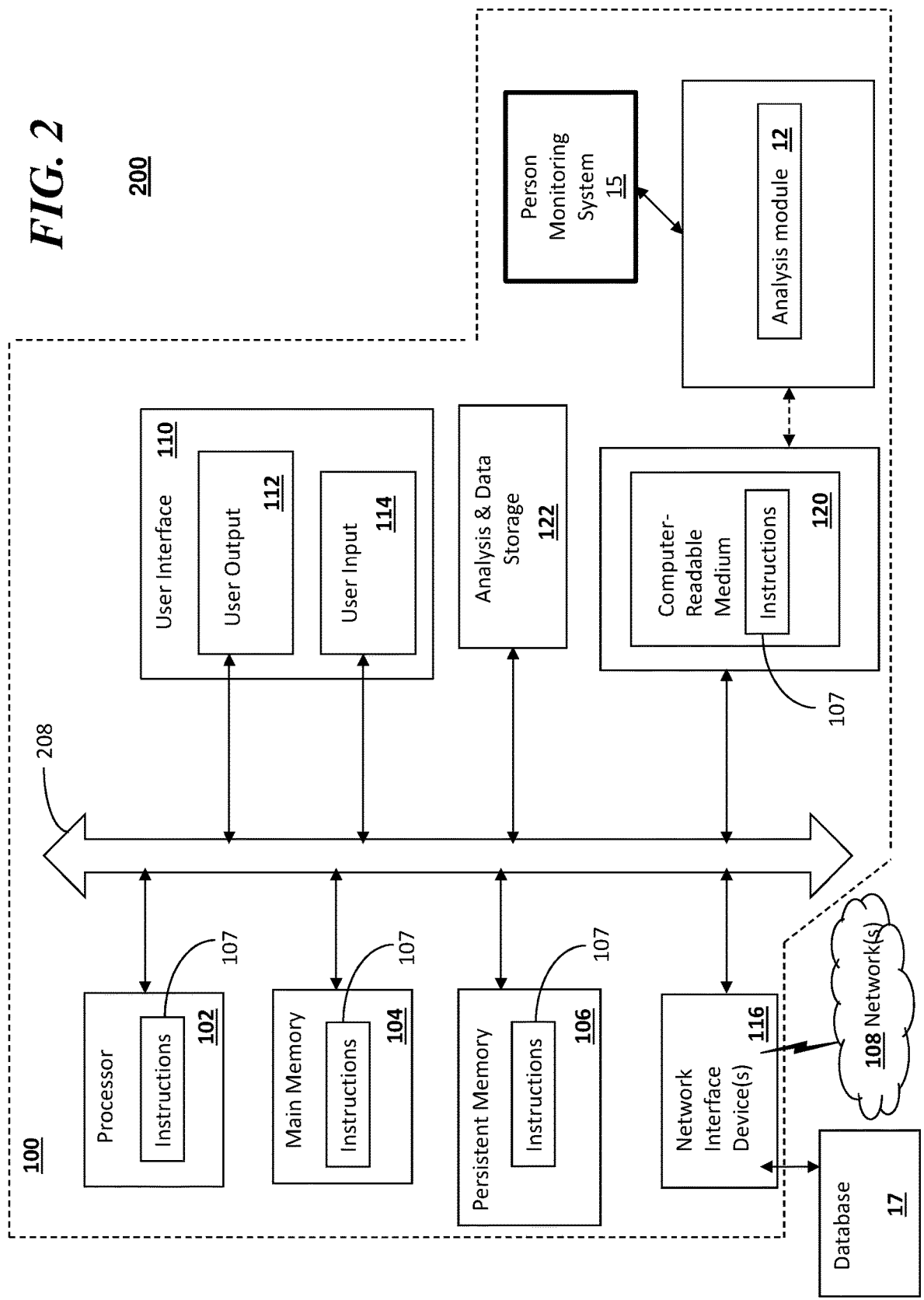
FIG. 2 is a block diagram illustrating an example of the information processing system of FIG. 1.

As shown in FIG. 2, an information processing system 100 of a system 200 can be communicatively coupled with the analysis module 12 and person monitoring system 15 of FIG. 1 or alternatively one or more of the analysis module or person monitoring system 15 can be integrated with the information processing system 100. According to this example, at least one processor 102, responsive to executing instructions 107, performs operations to communicate with the analysis module 12 via a bus architecture 208, as shown. The at least one processor 102 is communicatively coupled with main memory 104, persistent memory 106, and a computer readable medium 120. The processor 102 is communicatively coupled with an Analysis & Data Storage 122 that, according to various implementations, can maintain stored information used by, for example, the analysis module 12 and more generally used by the information processing system 100. Optionally, for example, this stored information can include information received from the person monitoring system 15. For example, this stored information can be received periodically from the person monitoring system 15 and updated over time in the Analysis & Data Storage 122. That is, according to various example implementations, a history log of the information received over time from the person monitoring system 15 can be stored in the Analysis & Data Storage 122. Additionally, according to another example, an order history log of an order history of toys and playthings ordered (and/or purchased) for one or more persons can be maintained stored in the Analysis & Data Storage 122. The analysis module 12, and the information processing system 100, can use the information from the order history log such as in the analysis process and in making recommendations.

The computer readable medium 120, according to the present example, can be communicatively coupled with a reader/writer device (not shown) that is communicatively coupled via the bus architecture 208 with the processor 102. The instructions 107, which can include instructions, configuration parameters, and data, may be stored in the computer readable medium 120, the main memory 104, the persistent memory 106, and in the processor's internal memory such as cache memory and registers, as shown.

The information processing system 100 includes a user interface 110 that comprises a user output interface 112 and user input interface 114. Examples of elements of the user output interface 112 can include a display, a speaker, one or more indicator lights, one or more transducers that generate audible indicators, and a haptic signal generator. Examples of elements of the user input interface 114 can include a keyboard, a keypad, a mouse, a track pad, a touch pad, a microphone that receives audio signals. The received audio signals, for example, can be converted to electronic digital representation and stored in memory, and optionally can be used with voice recognition software executed by the processor 102 to receive user input data and commands.

A network interface device 116 is communicatively coupled with the processor 102 and provides a communication interface for the information processing system 100 to communicate via one or more networks 108. The networks can include wired and wireless networks, and can be any of local area networks, wide area networks, or a combination of such networks. For example, wide area networks including the Internet and the web can inter-communicate the information processing system 100 with other one or more information processing systems that may be locally, or remotely, located relative to the information processing system 100. It should be noted that mobile communications devices, such as mobile phones, Smart phones, tablet computers, lap top computers, and the like, which are capable of at least one of wired and/or wireless communication, are also examples of information processing systems within the scope of the present disclosure. The network interface device 116 can provide a communication interface for the information processing system 100 to access the database 17 according to various embodiments of the disclosure.

The instructions 107, according to the present example, include instructions for monitoring, instructions for analyzing, instructions for retrieving and sending information and recommendations to a shopping cart, and related configuration parameters and data. It should be noted that any portion of the instructions 107 can be stored in a centralized information processing system or can be stored in a distributed information processing system, i.e., with portions of the system distributed and communicatively coupled together over one or more communication links or networks.

Figure 3:
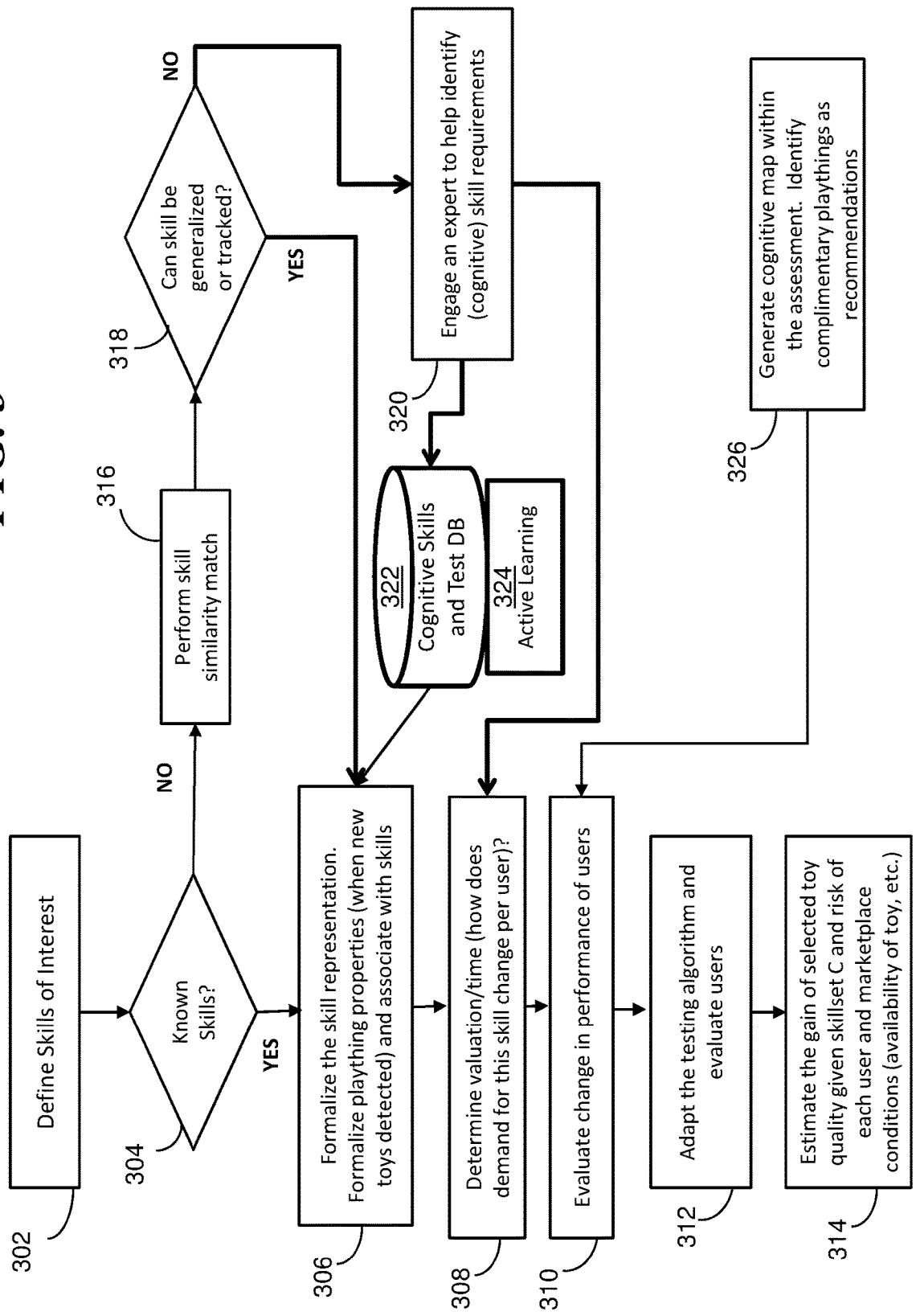
FIG. 3 is an example process of tracking a skill for use with providing a recommendation according to various embodiments of the present disclosure.
Figure 4:
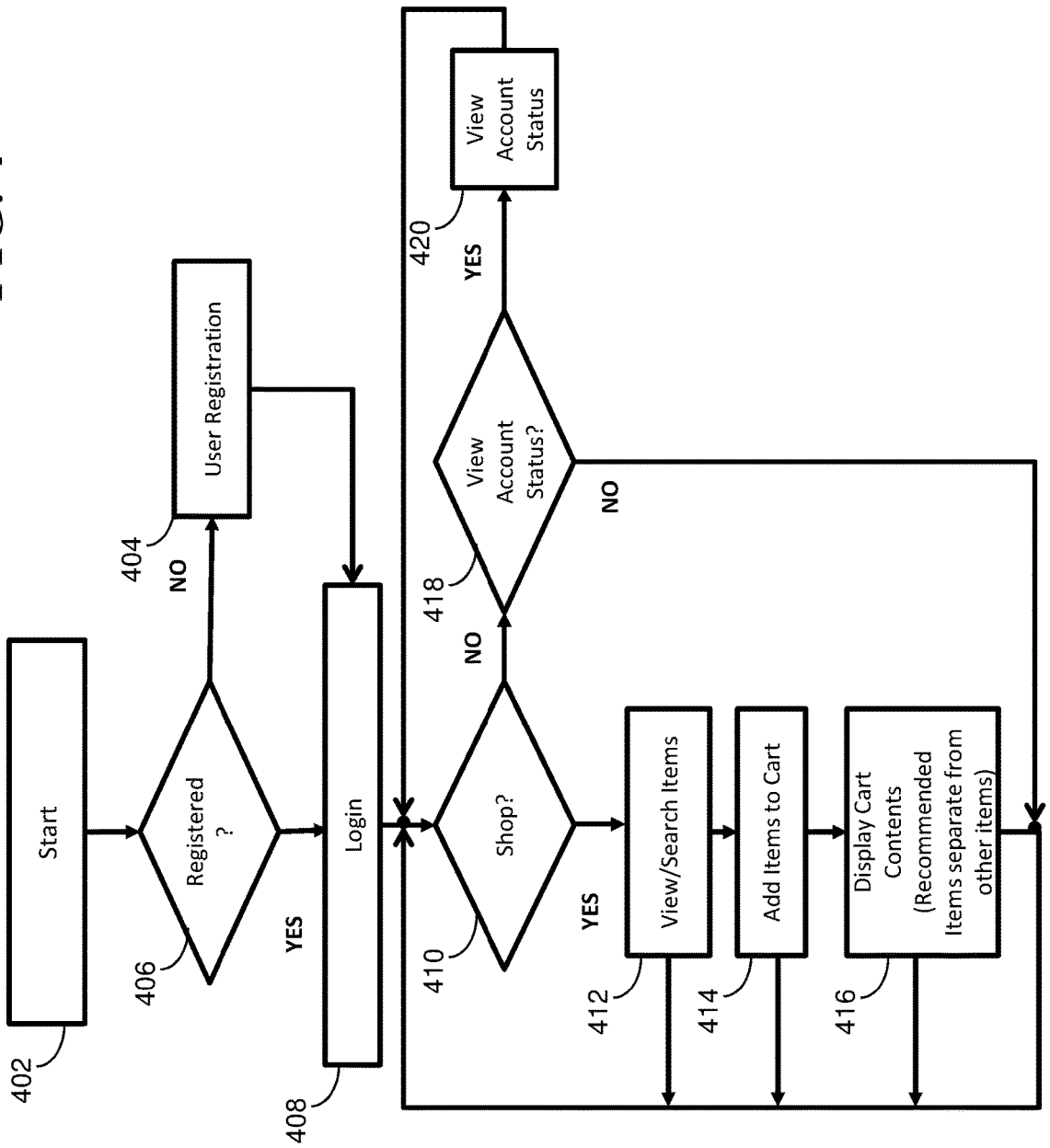
FIG. 4 is an example process of using a shopping cart with the recommendation or representation of the recommended item generated with the process of FIG. 3 or systems of FIG. 1 or 2 according to various embodiments of the present disclosure.

FIGS. 3 and 4 illustrate examples of methods according to various embodiments of the present disclosure that operate in conjunction with the information processing system of FIG. 2. Specifically, according to an example shown in FIG. 3, a method 300 of generating a recommendation or representation of a recommended item for a plaything can include defining a skill or skills of interest at step 302. At decision block 304, a determination is made whether the skill of interest is known. If the skill is known at decision block 304, then a skill representation is formalized at step 306. For example, the plaything properties can be associated with particular skills when a new plaything is detected. At step 308, a valuation or time period is analyzed for a particular user. In other words, how does demand for the known skill change per user? At step 310, an evaluation of the change in performance for a particular skill is done for the user or users. At step 326, the method 300 can generate a cognitive map within or as part of the assessment to identify and recommend complimentary playthings to improve a skill or to enable transition to a more complicated or higher level skill. At step 312, the testing algorithm can be adapted as the users are further evaluated in view of user performances and/or in view of comparisons with other user performances. At step 314, the method can estimate the gain of a selected toy quality for a given skillset and further assess the risk for each user and further assess marketplace conditions (such as availability of particular playthings or toys, etc.).

If the skill or skills at decision block 304 are not known, then a skill similarity match can be performed at step 316. If the skill cannot be generalized or track at decision block 318, then an expert can be engaged at step 320 to help identify (cognitive) skill requirements for a particular skill. The expert input from 320 can be used to update a cognitive skills and test database 322 which is used in formalizing the skill representation at previously explained with step 306. In conjunction with the database 322, active learning at step 324 can be used to update and refine the database 322 as a result of evaluating the particular progress (or lack thereof) for a particular skill using a particular plaything. Other factors can certainly be considered including whether the plaything is better for an individual or for use in a group setting or whether a particular color or other parameter affects the skill improvement.

Referring to FIG. 4, a method 400 of updating a shopping cart with a representation of a recommended item or a recommended plaything is illustrated. The system starts at step 402 and determines whether a user is registered at decision block 406. If the user is not registered, then the user is invited to register at step 402. If the user is registered or newly registered, the user is invited to login to the shopping system at step 408. The system may place recommended toys or playthings or more appropriately a representation of the recommended item into a shopping cart at the decision block 410 labeled "Shop?" The automated system may be activated when someone registers (at step 404) for such a service. Of course, a user may always view and search for playthings at step 412 and then remove toys in a shopping cart that are not desired or add additional items at step 414. More toys may be automatically added through time and discarded after too much time has passed and after a child may have developed further (as can be confirmed by the person monitoring system). At step 416 labeled "Display Cart Contents," the representations of playthings or toys that have automatically been added to the shopping cart may be visually segregated from items that have not been added in this fashion as illustrated in the shopping cart 24 of FIG. 1. If desired, a user's friends may be allowed to peek into the region of the cart dealing with automatically added toys. If the user does not want to shop at decision block 418, then the user can view their account status at step 420 or otherwise continuing traversing the shopping system if the user does not want to view the account status at decision block 418.

In a particular example, as a newborn is starting to roll-over, the vision elements of monitoring service or the person monitoring system 15 of FIG. 1 may capture that the baby is struggling to roll back once they are on their tummy, and a recommendation service can suggest a set of activities for the babies to learn the new skill. This assessment of muscle development could be achieved by using computer vision algorithms to track body joints and pose(s) of the person using data captured from an RGB-D camera (similar technology used for Kinect gaming).

In parallel, the service may suggest toys or playthings that are not just age-suitable, but also fit well with the skill of the baby to promote the development (e.g., toys of certain color, shape, texture). Similarly, for people with Alzheimer's the recommendation service or system can, based on the input from the monitoring service or person monitoring system 15 and the evaluation of the cognitive state of the user using the analysis module 12, suggest playthings that can stimulate their behavior and cognitive skills.

Furthermore, the service can also capture capabilities of multiple users at the same time (e.g., a group of preschoolers) and recommend suitable games that allow all the multiple users to participate.

In another embodiment, electrodermal sensors (e.g., Q-sensors) could be used to measure interest/excitement of a child while playing with a particular toy, which is an important feature for recommending future toys and can be incorporated in the active learning process described with respect to step 324 in FIG. 3. More reliable measures could be obtained by fusing multiple emotional predictors from different modalities, for example, correlating facial expression analysis with high electrodermal activity. Additionally, social development skills could be assessed, for example, by measuring stress levels of kids while playing social games, using body-worn sensors for measuring respiration and heart rate using Google Glass as described by Hernandez J., Li Y., Rehg J., and Picard R. W. in their paper BioGlass: Physiological parameter estimation using a head-mounted wearable device. International Conference on Wireless Mobile Communication and Healthcare (MobiHealth), Nov. 3-5, 2014.

Computer vision has been used for monitoring non-verbal behavior of children in order to identify behavior disorders such as Autism and monitor degenerative neuromuscular diseases. This technology could be used as part of the "analysis module" 12 of FIG. 1 for plaything or toy recommendations as discussed above. Age estimation based on computer vision could also be used to recommend age-suitable toys.

Of course, playing is important to children. Systems in accordance with the embodiments herein can have information on playthings or toys that can be divided into several groups, depending on the part of the child it helps to develop. The groups can include, for example, a first group for toys for physical or muscle development such as wagons, bikes, boxes, puzzles, blocks, brooms, and shovels or a second group for toys for sensory (touch, sight, sound, taste, smell) development such as water toys, musical instruments, bubbles, play dough, and sand toys or a third group for toys for make-believe and social development such as dolls, dress-up clothes, cars, trucks, games, and books. A fourth group can include toys for creative and intellectual development such as clay, crayons, paints, books, paper, and scissors.

Children gain self-confidence as they play with toys, and this can be inferred (with a certain degree of confidence) through motions, vocalizations, and facial expressions. Systems in accordance with the embodiments can also take into account any of the following considerations: child age, child interest, or child abilities. It can also take into account the following aspects of toys and services: Is it safe? Does it capture the child's interest? Is the toy appropriate for their age and abilities? Can the child use it alone or is another person needed? What kind of activities will it encourage? If you want to settle children down, books or puzzles are better choices than balls if the desired activity encouraged is directed towards calming.

Thus, in the embodiments herein, the signal sent to the analysis module and/or shopping cart may be a multidimensional vector which can consider such aspects as: toys for physical or muscle development, toys for sensory development, toys for make-believe and social development and toys for creative and intellectual development. Also, certain aspects of relevance to a cohort of children can be learned. Although, gender-neutral toys may often be considered, if desired, gender, age, health, and other information may be considered when using this multidimensional vector. The multidimensional vector may include for example: safety, age, ability, capture the child's interest, etc.

In some embodiments, infants may need bright-colored toys of many textures. They should be washable, non-breakable, and have no sharp edges. Infants are interested in looking at toys, touching them with their hands and mouth, fitting pieces of things together and making sense of their worlds. The embodiments herein can choose toys for them to look at, feel, chew on, hold, and drop. As infants begin to walk or crawl, they also will be interested in push-pull toys and balls. Appropriate infant toys can include (but are not limited to): rattles, squeak toys, blocks, crib mobiles, stacking toys and rings, push-pull toys, stuffed animals or dolls, nested boxes or cups, books with rhymes, simple picture books, noise making toys, small soft toys for throwing, strings of beads (large, plastic), and music-making toys.

If desired, in one embodiment, the system may endeavor to determine the age of the toy recipient. Of course, a parent can manually provide this information, but on the other hand, the age range for the toy recipient may be estimated based at least in part on a parent order history of toys purchased for a child. As an example, a customer order for a first toy for the recipient is received, where the first gift is associated with a first age appropriateness designation. At a second date, a customer order for a second toy for the recipient is received, where the second gift is associated with a second age appropriateness designation. An age range associated with the recipient is then estimated based upon at least the first age appropriateness designation and the second age appropriateness designation. Notice that the system can learn based on a history of orders and "likes" at an online toy shop. Again, this can be a part of the active learning step 324 described in FIG. 3.

Figure 5:
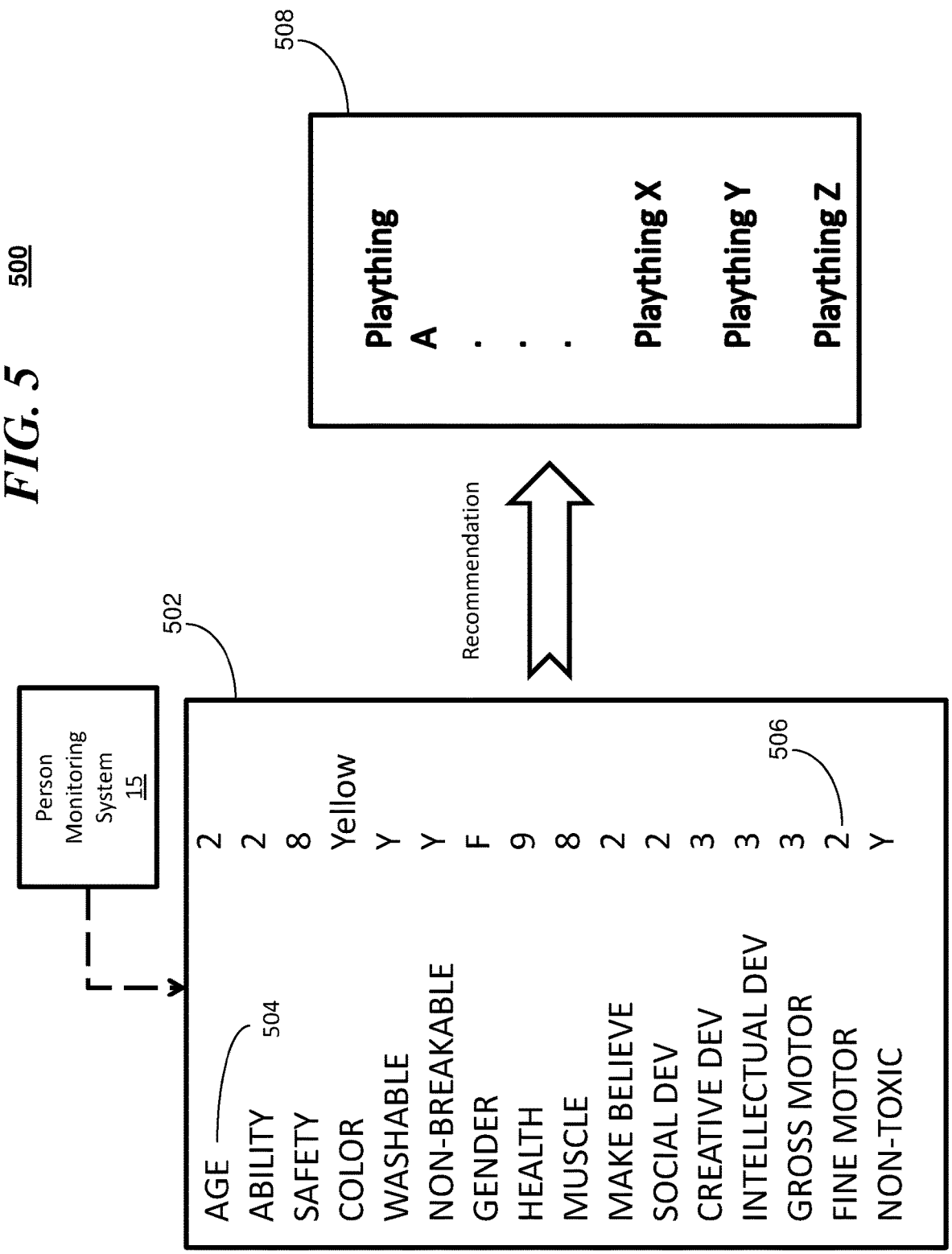
FIG. 5 is a table listing of factors or parameters and field entries and corresponding recommendations for playthings according to various embodiments of the present disclosure.

Referring to FIG. 5, a table listing 502 of factors or parameters 504 and field entries 506 and corresponding recommendations for playthings 508 according to various embodiments of the present disclosure is illustrated as part of a system 500. The parameters 504 illustrated and the corresponding field entries 506 are only provided as examples and the embodiments herein are not limited thereto. The parameters can include age, ability, safety, color, washability, breakability, gender, health, muscle development, make believe abilities, social development creative development, intellectual development, gross motor skill level, fine motor skill level, toxicity or other parameters. The field entries 506 can represent ages or level or other appropriate entries for the particular parameter being represented. The field entries can be populated automatically from the observed data obtained by the person monitoring system 15 or in other instances the field entries can be populated by a user such as a parent entering data for their child or a guardian entering data for an elderly person. Based on the parameters 504 and the entered field entries 506, the system 500 can make recommendations based on consulting a database and provide one of a number of recommendations for playthings 508 which can be ranked if desired based on the skill selected.

If desired, certain playthings or toys may actually change their own characteristics through time. For example, an educational toy may be composed of a toy body, arms, and head, and also contain a body position sensor, a temperature sensor, a vibration sensor, etc. As the baby or child develops, the toy may be permitted more complex interactions with the user.

Optionally, machine learning and active learning can be used to enhance computer-assisted methods for selecting and matching learning tools, toys, and services that possess developmental value with the individual characteristics of a child, and vendors such as Amazon.com more than likely want to partake in this process. Consider for example, in some embodiments the system can actually analyze commercially available products such as toys, games, books, and allied learning materials and the data relating to the personal traits required to use the product, the educational value of the product, the learning value of the product, the instructional variables required to use the product, and the description of the product can all be recorded. In some embodiments, the system herein can also record and analyze information concerning a child's sensory learning style preferences, medical conditions, social habits, emotional attitudes, and other factors or parameters that can enhance development, such as a cognitive trait, or a progression of cognitive traits. Cognitive trait is defined as a representation of measures of a toy or plaything user's total behavior over some period of time (including musculoskeletal gestures, speech gestures, eye movements, internal physiological changes, measured by imaging devices, microphones, physiological and kinematic sensors in a high dimensional measurement space) within a lower dimensional feature space. One or more preferred embodiments use certain feature extraction techniques for identifying certain cognitive traits. Specifically, the reduction of a set of behavioral measures over some period of time to a set of feature nodes and vectors, corresponding to the behavioral measures' representations in the lower dimensional feature space, is used to identify the emergence of a certain cognitive trait over that period of time. Emergence of a certain cognitive trait may then be related to a progression of a succession of cognitive traits based on their order and overlap. This emergence and progression may then be mapped to a recommendation of a plaything.

In some embodiments, a toy doll may be capable of playing preprogrammed speech, and the nature of this speech can be automatically controlled by the multidimensional vector(s) mentioned above.

In some embodiments, the system can encompass automatic shopping clubs where the system automatically recommends a plaything (or a representation of a recommended item) on a periodic basis based on the observed development of the user (or user's child being observed). For example, one embodiment can include an automatic "Cognitive enhancing toy-of-the-month" feature. Although this model has been used for books, food items, plants, baby toys, and pet toys, none has used automatic cognitive monitoring to populate a list of devices, playthings or toys most likely to enhance the cognitive skills of an individual with a cognitive challenge (developmental, aging related, disease related, injury related).

In yet other embodiments, a system can be used to rank playthings generally and fulfill a user's subscription as part of the overall process. For example, such a system can include the following steps:

1. Add toys and devices to a shopping list as above. 2. Over a predetermined time interval T, begin to accumulate confidence that each toy is appropriate for bettering the cognitive state of the subject according to the disclosed methods above. 3. At time interval T, rank all shopping list entries according to the quantity of evidence accumulated. 4. Chose the top N entries in the ranking and automatically send the toys and/or devices to the subject in fulfillment of the user's subscription agreement.

NON-LIMITING EXAMPLES

The present invention may be a system, a method, and/or a computer program product. The computer program product may include a computer readable storage medium (or media) having computer readable program instructions thereon for causing a processor to carry out aspects of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer readable program instructions described herein can be downloaded to respective computing/processing devices from a computer readable storage medium or to an external computer or external storage device via a network or networks, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems), and computer program products according to embodiments of the invention. It will be understood that each block of the flowchart illustrations and/or block functional diagrams, and combinations of blocks in the flowchart illustrations and/or block functional diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or functional block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the computer readable storage medium is shown in an example embodiment to be a single medium, the term "computer readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methods of the subject disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a computer-readable storage medium, as listed herein and including art-recognized equivalents and successor media, in which the software implementations herein are stored.

Although the present specification may describe components and functions implemented in the embodiments with reference to particular standards and protocols, the disclosure is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although only one processor is illustrated for an information processing system, information processing systems with multiple CPUs or processors can be used equally effectively. Various embodiments of the present disclosure can further incorporate interfaces that each includes separate, fully programmed microprocessors that are used to off-load processing from the processor. An operating system (not shown) included in main memory for the information processing system may be a suitable multitasking and/or multiprocessing operating system, such as, but not limited to, any of the Linux, UNIX, Windows, and Windows Server based operating systems. Various embodiments of the present disclosure are able to use any other suitable operating system. Various embodiments of the present disclosure utilize architectures, such as an object oriented framework mechanism, that allows instructions of the components of operating system (not shown) to be executed on any processor located within the information processing system. Various embodiments of the present disclosure are able to be adapted to work with any data communications connections including present day analog and/or digital techniques or via a future networking mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The terms "communicatively coupled" or "communicatively coupling" include, but are not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop personal computer (laptop PC), a tablet computer, a smart phone, a mobile phone, a wireless communication device, a personal digital assistant, a workstation, and the like. A processing system may include one or more processing systems or processors. A processing system can be realized in a centralized fashion in one processing system or in a distributed fashion where different elements are spread across several interconnected processing systems.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the examples presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

What is claimed is:

1. A method for automatically controlling items in an online shopping cart, the method comprising:

automatically monitoring measurements of a specific cognitive skill performance evaluation of a first user playing with a plaything or exercising with exercise equipment;

presenting, on a display of an electronic device to a second user, an online shopping cart with at least one item recommended by a current measured specific cognitive skill performance evaluation of the first user playing with a plaything or exercising with exercise equipment, wherein the at least one item comprises at least one plaything or exercise equipment;

receiving an automatically updated measured specific cognitive skill performance evaluation of the first user playing with a plaything or exercising with exercise equipment;

automatically determining a change in performance of the first user for a particular skill level based on estimating a gain in a quality associated with a selected plaything or a selected exercise equipment, the quality being for a skill set at the particular skill level; and automatically removing from the online shopping cart and from display of the online shopping cart a representation of the at least one item recommended by the current measured specific cognitive skill performance evaluation of the first user, and displaying in the online shopping cart an empty space for the removed representation of the at least one item recommended by the current measured specific cognitive skill performance evaluation of the first user, without intervention of the second user, based on the automatically determined change in performance of the first user for the particular skill level.

2. The method of claim 1, wherein the automatically monitoring is performed with an information processing system comprising a person monitoring system communicatively coupled with one or more sensors, the person monitoring system monitors at least one among sounds, body and face motions, facial expressions, physiological signals, electrodermal activity, respiration rate, or heart rate of a plurality of persons being monitored, including the first user being monitored.

3. The method of claim 1, wherein the at least one item is a first toy, and at least one new item is a second toy recommended by the updated measured specific cognitive skill performance evaluation of the first user, the second toy being a replacement for the first toy in the online shopping cart.

4. The method of claim 1, further comprising
displaying the empty space in a segregated area in the online shopping cart along with a representation of another recommended item already existing in the segregated area in the online shopping cart; and
visually segregating the empty space and the representation of the another recommended item in the segregated area from other not recommended items existing in the online shopping cart outside of the segregated area.

5. The method of claim 4, further comprising providing access to the visually segregated empty space and the representation of the another recommended item in the segregated area in the online shopping cart to connections from a social network by allowing friends of the second person in the social network to peek into the segregated area in the online shopping cart.

6. The method of claim 1, further comprising:
periodically and automatically sending at least one new item recommended by an updated measured specific cognitive skill performance evaluation of the first user playing with a plaything or exercising with exercise equipment, to the online shopping cart;
automatically removing from the online shopping cart and from display of the online shopping cart the at least one item recommended by the current measured specific cognitive skill performance evaluation of the first user, and displaying in the online shopping cart an empty space for the removed at least one item recommended by the current measured specific cognitive skill performance evaluation of the first user; and
purchasing the at least one new item from the online shopping cart.

7. A system for automatically controlling items in an online shopping cart, the system comprising:
an information processing system comprising a person monitoring system communicatively coupled with one or more sensors for monitoring measurements of at least a first user, the person monitoring system communicatively coupled with one or more of: a video camera, a microphone, or one or more physiological sensors attached to a body of the first user, the video camera, the microphone, or the one or more physiological sensors, monitor at least one among sounds, body and face motions, facial expressions, physiological signals, electrodermal activity, respiration rate, or heart rate of the first user being monitored;
a network interface device for communicating via one or more networks; at least one memory; and
at least one processor communicatively coupled to the network interface device, the at least one memory, the person monitoring system, and the information processing system, the at least one processor configured to perform a method comprising:
automatically monitoring measurements of a specific cognitive skill performance evaluation of a first user playing with a plaything or exercising with exercise equipment;
presenting, on a display of an electronic device to a second user, an online shopping cart with at least one item recommended by a current measured specific cognitive skill performance evaluation of the first user playing with a plaything or exercising with exercise equipment, wherein the at least one item comprises at least one plaything or exercise equipment;
receiving an automatically updated measured specific cognitive skill performance evaluation of the first user playing with a plaything or exercising with exercise equipment;
automatically determining a change in performance of the first user for a particular skill level based on estimating a gain in a quality associated with a selected plaything or a selected exercise equipment, the quality being for a skill set at the particular skill level; and
automatically removing from the online shopping cart and from display of the online shopping cart a representation of the at least one item recommended by the current measured specific cognitive skill performance evaluation of the first user, and displaying in the online shopping cart an empty space for the removed representation of the at least one item recommended by the current measured specific cognitive skill performance evaluation of the first user, without intervention of the second user, based on the automatically determined change in performance of the first user for the particular skill level.

8. The system of claim 7, wherein the person monitoring system is configured to monitor at least one among sounds, body and face motions, facial expressions, physiological signals, electrodermal activity, respiration rate, or heart rate for a plurality of persons being monitored, including the first user being monitored.

9. The system of claim 7, wherein the person monitoring system includes at least one of a camera, an audio recording device, or a physiological measurement device comprising one or more physiological sensors attached to a body of the first user, the one or more physiological sensors measure at least one of motion, temperature, heart rate, or physiological signals, of the first user.

10. The system of claim 7, wherein the at least one processor is further configured to
displaying the empty space in a segregated area in an online shopping cart along with a representation of another recommended item already existing in the segregated area in the online shopping cart; and visually segregate the empty space and the representation of the another recommended item in the segregated area from other not recommended items existing in the online shopping cart outside of the segregated area.

11. The system of claim 10, wherein the at least one processor is further configured to provide access to the visually segregated empty space and the representation of the another recommended item in the segregated area in the online shopping cart to connections from a social network by allowing friends of the second person in the social network to peek into the segregated area in the online shopping cart.

12. The system of claim 7, wherein the at least one processor is further configured to:

periodically and automatically send at least one new item recommended by an updated measured specific cognitive skill performance evaluation of the first user playing with a plaything or exercising with exercise equipment, to the online shopping cart;

automatically removing from the online shopping cart and from display of the online shopping cart the at least one item recommended by the current measured specific cognitive skill performance evaluation of the first user, and displaying in the online shopping cart an empty space for the removed at least one item recommended by the current measured specific cognitive skill performance evaluation of the first user; and purchase the at least one new item from the online shopping cart.

13. A computer readable storage medium, comprising computer instructions which, responsive to being executed by at least one processor of at least one computing device, cause the processor to perform operations comprising:

automatically monitoring measurements of a specific cognitive skill performance evaluation of a first user playing with a plaything or exercising with exercise equipment;

presenting, on a display of an electronic device to a second user, an online shopping cart with at least one item recommended by a current measured specific cognitive skill performance evaluation of the first user playing with a plaything or exercising with exercise equipment, wherein the at least one item comprises at least one plaything or exercise equipment;

receiving an automatically updated measured specific cognitive skill performance evaluation of the first user playing with a plaything or exercising with exercise equipment;

automatically determining a change in performance of the first user for a particular skill level based on estimating a gain in a quality associated with a selected plaything or a selected exercise equipment, the quality being for a skill set at the particular skill level; and automatically removing from the online shopping cart and from display of the online shopping cart a representation of the at least one item recommended by the current measured specific cognitive skill performance evaluation of the first user, and displaying in the online shopping cart an empty space for the removed representation of the at least one item recommended by the current measured specific cognitive skill performance evaluation of the first user, without intervention of the second user, based on the automatically determined change in performance of the first user for the particular skill level.

* * * * *